United States Patent
Beier et al.

(10) Patent No.: US 10,309,311 B2
(45) Date of Patent: *Jun. 4, 2019

(54) ACCESSORY MOUNTING FOR A GAS TURBINE ENGINE

(71) Applicant: ROLLS-ROYCE DEUTSCHLAND LTD & CO KG, Dahlewitz (DE)

(72) Inventors: Jürgen Beier, Schulzendorf (DE); Gideon Daniel Venter, Berlin (DE)

(73) Assignee: ROLLS-ROYCE DEUTSCHLAND LTD & CO KG, Dahlewitz (DE)

( * ) Notice: Subject to any disclaimer, the term of this patent is extended or adjusted under 35 U.S.C. 154(b) by 26 days.

This patent is subject to a terminal disclaimer.

(21) Appl. No.: 15/681,106

(22) Filed: Aug. 18, 2017

(65) Prior Publication Data

US 2017/0370292 A1    Dec. 28, 2017

Related U.S. Application Data

(63) Continuation of application No. 14/300,543, filed on Jun. 10, 2014, now Pat. No. 9,765,696.

(30) Foreign Application Priority Data

Jun. 21, 2013 (GB) .................................. 1311072.1

(51) Int. Cl.
*F02C 7/20* (2006.01)
*F02C 7/32* (2006.01)
(Continued)

(52) U.S. Cl.
CPC ................ *F02C 7/20* (2013.01); *B64D 27/26* (2013.01); *B64D 29/06* (2013.01); *F02C 7/32* (2013.01);
(Continued)

(58) Field of Classification Search
CPC .......... F02C 7/32; F02C 7/20; F05D 2240/90; B64D 2027/266; B64D 2027/268
See application file for complete search history.

(56) References Cited

U.S. PATENT DOCUMENTS 2,978,209 A * 4/1961 Kerry .................... B64D 27/18
244/130
3,765,124 A    10/1973 Ferris et al.
(Continued)

FOREIGN PATENT DOCUMENTS

EP    1 746 262 A2    1/2007
EP    2 607 658 A2    6/2013
(Continued)

OTHER PUBLICATIONS

Nov. 18, 2016 Office Action Issued in U.S Appl. No. 14/300,543.
(Continued)

*Primary Examiner* — William H Rodriguez
*Assistant Examiner* — Thomas P Burke
(74) *Attorney, Agent, or Firm* — Oliff PLC

(57) ABSTRACT

A gas turbine engine assembly is connected to a pylon for mounting the gas turbine engine to an aircraft. The assembly has a frame supporting at least one accessory independently of the gas turbine engine. Frame is attached to the pylon at forward and rearward engine mounting locations. The frame includes at least one hollow tube and at least one hollow tube is fluid tight. The one hollow tube is evacuated or contains pressurized fluid and a pressure sensor is provided to detect a change in pressure in the at least one hollow tube to determine if there is a leak in the at least one hollow tube and hence if the frame is damaged. This ensures that the frame may be repaired or replaced before there is a loss of operation of one or more of the accessories which may result in a failure of the gas turbine engine.

2 Claims, 4 Drawing Sheets

(51) Int. Cl.
  *B64D 27/26* (2006.01)
  *B64D 29/06* (2006.01)
  *G01M 3/28* (2006.01)
  *G01M 15/14* (2006.01)

(52) U.S. Cl.
  CPC .......... *G01M 3/2846* (2013.01); *G01M 15/14* (2013.01); *B64D 2027/266* (2013.01); *B64D 2027/268* (2013.01); *Y02T 50/672* (2013.01)

(56) References Cited

U.S. PATENT DOCUMENTS

| | | | |
|---|---|---|---|
| 4,721,413 A * | 1/1988 | Crohas | G01M 3/26 |
| | | | 405/195.1 |
| 6,286,361 B1 | 9/2001 | Jones et al. | |
| 6,328,293 B1 | 12/2001 | Olsen | |
| 6,357,220 B1 | 3/2002 | Snyder et al. | |
| 7,577,548 B1 | 8/2009 | Przytula et al. | |
| 9,416,734 B2 | 8/2016 | Thies et al. | |
| 9,765,696 B2 * | 9/2017 | Beier | F02C 7/20 |
| 2006/0038066 A1 | 2/2006 | Udall et al. | |
| 2008/0209914 A1 | 9/2008 | De Wergifosse et al. | |
| 2010/0264759 A1 | 10/2010 | Shafer et al. | |
| 2011/0239660 A1 | 10/2011 | Suciu et al. | |
| 2012/0198817 A1 * | 8/2012 | Suciu | B64D 27/26 |
| | | | 60/226.3 |
| 2012/0317991 A1 | 12/2012 | Frost et al. | |
| 2013/0160459 A1 * | 6/2013 | Thies | F02C 7/32 |
| | | | 60/796 |

FOREIGN PATENT DOCUMENTS

| | | |
|---|---|---|
| GB | 1 518 059 A | 7/1978 |
| JP | 2001-215178 A | 8/2001 |
| JP | 2011-46243 A | 3/2011 |
| WO | 2009/127260 A1 | 10/2009 |

OTHER PUBLICATIONS

Dec. 13, 2013 Search Report issued in British Application No. 1311072.1.

May 16, 2017 Notice of Allowance issued in U.S. Appl. No. 14/300,543.

Aug. 18, 2014 Search Report issued in European Application No. 14 17 1741.

* cited by examiner

ACCESSORY MOUNTING FOR A GAS TURBINE ENGINE

This is a continuation application of application Ser. No. 14/300,543 filed Jun. 10, 2014, which claims priority to GB 1311072.1, filed Jun. 21, 2013 in Great Britain. The disclosures of the prior applications are hereby incorporated by reference herein in their entirety.

FIELD OF THE INVENTION

The present invention relates to an accessory mounting for a gas turbine engine and in particular to an accessory mounting arrangement for a turbofan gas turbine engine.

BACKGROUND TO THE INVENTION

Our European patent application 12196908.3, published as EP2607658A2, discloses a gas turbine engine assembly connected to a pylon structure for mounting the gas turbine engine to an aircraft. The assembly has a frame attached to the pylon at forward and rearward engine mounting locations and the frame supports accessories independently of the gas turbine engine. Our European patent application 12196908.3, EP2607658A2, discloses that the accessories are arranged in an accessory mounting zone between the core engine casing and an inner nacelle surrounding the core engine.

The accessory mounting frame is subject to vibrations and/or other loads and these vibrations and/or other loads may result in damage to the accessory mounting frame. If the damage to the accessory mounting frame were to remain undetected and therefore unrepaired, or replaced, it may lead to a failure of one or more portions or the whole of the accessory mounting frame.

The accessory mounting frame carries all the accessories for the gas turbine engine and a failure of the accessory mounting frame may lead to loss of operation of one or more of the accessories, e.g. may lead to a loss of hydraulic supply, a loss of fuel supply, a loss of lubricant supply or a loss of electrical power which may result in a failure of the gas turbine engine.

Therefore the present invention seeks to provide a novel arrangement for detecting damage to the accessory mounting frame which reduces or overcomes the above mentioned problem.

STATEMENTS OF INVENTION

Accordingly the present invention provides a gas turbine engine assembly connected to a pylon structure for mounting the gas turbine engine to an aircraft, the assembly having a frame supporting at least one accessory independently of the gas turbine engine, the frame being attached to the pylon at forward and rearward engine mounting locations, the frame comprising at least one hollow tube, the at least one hollow tube being fluid tight, the at least one hollow tube being evacuated or containing pressurised fluid and a pressure sensor being arranged to detect a change in the pressure in the at least one hollow tube to determine if there is a leak in the at least one hollow tube and hence if the frame is damaged.

The frame may provide a direct load path between the at least one accessory and one or more forward and rearward engine mounting locations of the gas turbine engine.

Anti-vibration mounts may be provided between the frame and the forward and/or rearward mount engine mounting locations of the gas turbine engine.

Anti-vibration mounts may be provided between the frame and the at least one accessory.

The frame may comprise at least one jointed strut for providing axial movement for compensation of thermal expansion.

The frame may further comprise a ring structure for accessory mounting purposes, the ring structure being arranged coaxially with the axis of the engine.

The ring structure may be provided by a plurality of curved segments welded or bolted together.

An integral mounting plate may be provided to interface between the pylon structure and the frame.

The frame may comprise a front support and a rear support. The front support may have two front struts arranged on opposite sides of the engine and the rear support may have two rear struts arranged on opposite sides of the engine.

The at least one accessory may be an accessory gearbox, a hydraulic pump, an oil pump, a fuel pump, an electrical generator or an electrical motor.

The assembly may have an accessory gearbox and the accessory gearbox may be connected to the front mount by the front support and being connected to the rear mount by the rear support.

An axial link may be provided between a front structure and the accessory gearbox or the frame structure to reduce unwanted axial movement of the accessory gearbox or the frame structure.

The assembly may having an accessory gearbox, the frame comprising a ring structure arranged coaxially with the axis of the engine, the ring structure being connected to the rear mount by the rear support, the accessory gearbox being connected to the front mount by the front support and the accessory gearbox being connected to the ring structure by at least one additional strut.

The at least one additional strut may be connected to the front support.

A nacelle may surround the core engine wherein the at least one accessory is positioned within the nacelle.

The nacelle may have an opening in a forward position of the nacelle to supply cooling air over the accessories.

The nacelle may have an opening in a rearward position of the nacelle to discharge cooling air out of nacelle.

The nacelle may be an inner nacelle separating the core engine from a bypass duct.

There may be a plurality of accessories.

The frame may define a plurality of fluid tight chambers, each chamber being evacuated or containing pressurised fluid and each chamber having a pressure sensor arranged to detect a change in the pressure in the associated chamber to determine if there is a leak in the associated chamber and hence if the frame is damaged.

The frame may comprise a plurality of hollow tubes, each hollow tube being fluid tight and defining a respective chamber, each hollow tube being evacuated or containing pressurised fluid and each hollow tube having a pressure sensor arranged to detect a change in the pressure in the associated hollow tube to determine if there is a leak in the associated hollow tube and hence if the frame is damaged.

The pressurised fluid may be an inert gas. The inert gas may be nitrogen.

BRIEF DESCRIPTION OF THE DRAWINGS

The present invention will be more fully described by way of example with reference to the accompanying drawings, in which:—

DETAILED DESCRIPTION

Figure 1:
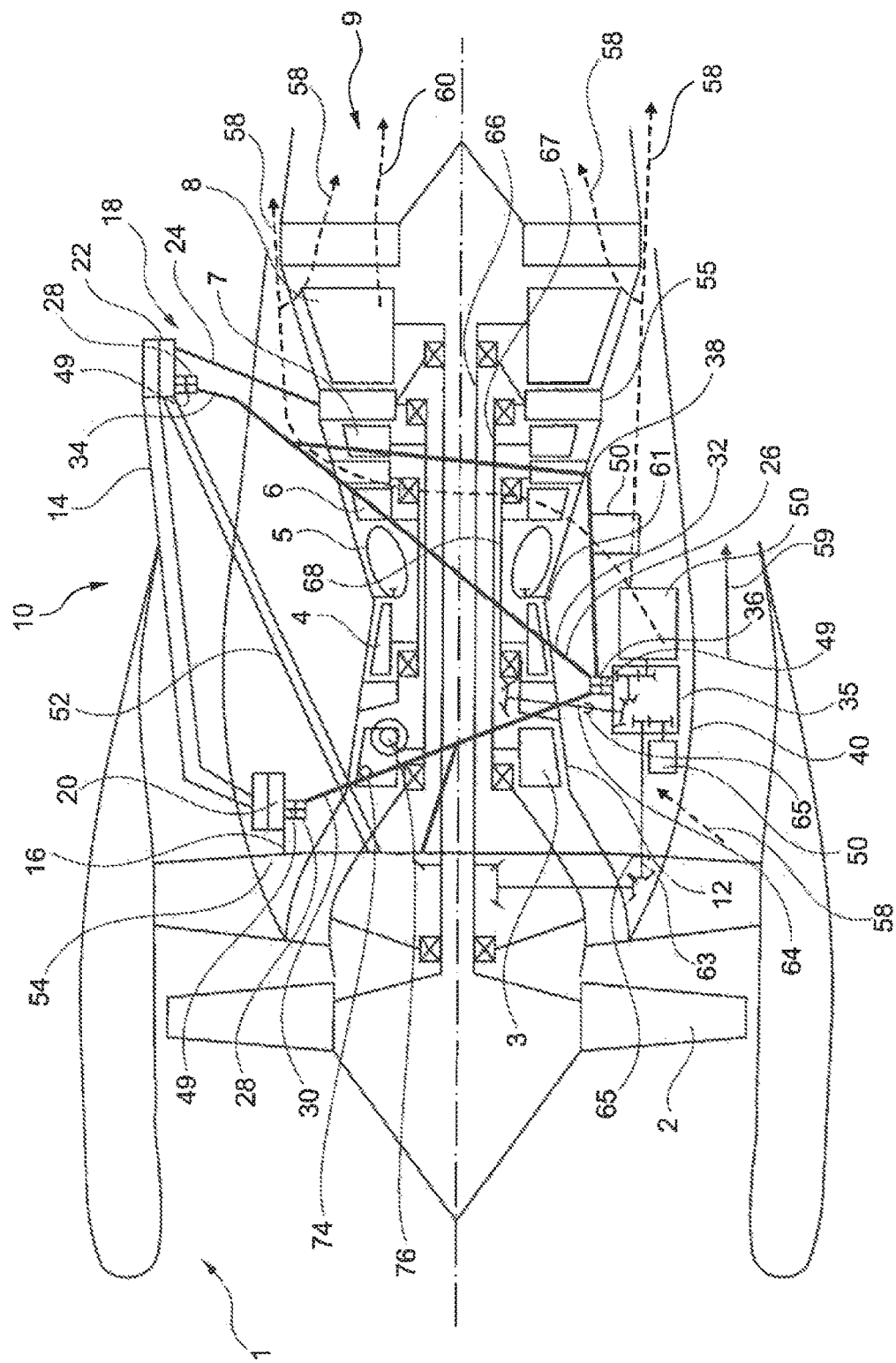
FIG. 1 is schematic view of a turbofan gas turbine engine having an accessory mounting frame according to the present invention.

A turbofan gas turbine engine 10, as shown in FIG. 1, comprises, in axial flow series, an air intake 1, a propulsive fan 2, an intermediate pressure compressor 3, a high pressure compressor 4, combustion equipment 5, a high pressure turbine 6, an intermediate pressure turbine 7, a low pressure turbine 8 and an exhaust nozzle 9. Air entering the air intake 1 is accelerated by the fan 2 to produce two air flows. A first air flow is supplied into the intermediate pressure compressor 3 and a second air flow 59 that passes over an inner nacelle 40 and though a bypass duct which provides propulsive thrust. The intermediate pressure compressor 3 compresses the air flow directed into it before delivering the air to the high pressure compressor 4 where further compression takes place.

Compressed air exhausted from the high pressure compressor 4 is directed into the combustion equipment 5, where it is mixed with fuel that is injected from fuel injectors 61 and the mixture is combusted. The resultant hot combustion products expand through and thereby drive the high, intermediate and low pressure turbines 6, 7 and 8 respectively before this flow is exhausted as a core stream 60 through the nozzle 9 to provide additional propulsive thrust. The high, intermediate and low pressure turbines 6, 7 and 8 respectively drive the high and intermediate pressure compressors 4 and 3 and the fan 2 by suitable interconnecting shafts: high pressure shaft 68, intermediate pressure shaft 67 and low pressure shaft 66.

A flow of cooling air 58 for the accessories enters the accessory mounting zone through an opening at the front, upstream end, of the inner nacelle 40 and is exhausted through an opening into the bypass air stream 59 at the rear, downstream end, of the inner nacelle 40 or is exhausted into the core flow 60 at the rear, downstream end, of the turbofan gas turbine engine 10 upstream of the exhaust nozzle 9.

The turbofan gas turbine engine 10 is mounted to the aircraft structure via a pylon 14 which locates on the turbofan gas turbine engine 10 at a front mount 16 and a rear mount 18. The mounts 16 and 18 carry the weight of the turbofan gas turbine engine 10 and transfer thrust loads from the turbofan gas turbine engine 10 through the pylon 14 to the aircraft structure. The front of the pylon 14 is attached to the front mount 16 through a front attachment bracket 20 which is integral with or bolted to the pylon 14. The rear of the pylon 14 is mounted to the rear engine mount 18 through a rear attachment bracket 22 and an engine link 24 which permits axial movement of the turbofan gas turbine engine 10 relative to the rear attachment bracket 22. The front mount 16 is provided on the front frame 54 in this example, but alternatively may be provided on the fan casing. Thus, the front mount 16 and the rear mount 18 may both be provided on the core engine casing or the front mount 16 is provided on the fan casing and the rear mount 18 is provided on the core engine casing.

Also attached to the pylon 14 is an accessory mounting frame 26 which is secured to the front attachment bracket 20 and the rear attachment bracket 22 by mounts 28, which may be anti-vibration mounts 49. The accessory mounting frame 26 of FIG. 1 has two front struts 30 that extend from the front attachment bracket 20 and join to respective rear struts 32 that extend from the rear attachment bracket 22. It will be appreciated that one arrangement of front and rear struts 30 and 32 passes to one side of the core engine and that a corresponding arrangement of front and rear struts 30 and 32 is provided on the opposite side of the core engine. Although the front and rear struts 30, 32 are shown as being straight it may be necessary to use curved struts that bow around the core engine.

Each rear strut 32 may be attached to the rear attachment bracket 22 through a swing link 34 which permits axial movement of the rear strut 32 as required by, for example, thermal growth.

The front and rear struts 30 and 32 together form a "V" arrangement and join at an accessory 35, in this case the accessory gearbox. The front and rear struts 30 and 32 are mounted to the accessory gearbox by one or more hinge mounts 36. The accessory gearbox 35 provides power to other engine accessories such as an electrical generator, hydraulic pumps, oil pumps, fuel pumps etc. The electrical generator may be a starter/generator such that the electrical generator may be used as an electrical motor to start the turbofan gas turbine engine 10.

The accessory gearbox 35 can be driven by a radial and an axial drive train, e.g. from the low speed drive train 63 which is driven by the low pressure shaft 66. The accessory gearbox can be further driven by a radial drive train e.g. by the high speed drive train 64 which is driven by the high pressure shaft 68. These drive trains have preferably one or more interconnections or couplings (e.g. spline connections) 65 to withstand movement of the accessory gearbox 35.

In the example of FIG. 1 the rear strut 32 has additional frame section 38 mounted to it. The additional frame section 38 advantageously provides additional locations for mounting of further accessories 50. The shape of the additional frame section 38 may be selected so that the further accessories 50 can be optimally located in order to reduce the length of any mounting brackets, drive trains or circuitry to the further accessories 50 or to ensure all the accessories 50 can fit within the inner nacelle line 40, which can be a congested volume. Exemplary accessories 50 which may be mounted are generators e.g. starter generators, pumps, gearboxes, brackets, cables, sensors, and wiring. The location of the components may be selected to provide good access for maintenance. The accessories 35, 50 are arranged within an accessory mounting zone defined between the inner nacelle 40 and a core engine casing 12.

The mounts 28, 36 are preferably anti vibration mounts which may beneficially decouple the accessories 35, 50 from the engine core vibrations. The mounts 28, 36 may be selected to further reduce the vibration response of the accessory mounting frame 26 and finally the vibration input to the accessories 35, 50. The corresponding vibration loads could, if not damped, lead to foot-point excitation of an accessory bracket and early failure of the bracket or accessory.

Engine thrust links 52 are provided, one on each side of the engine (preferably one arranged on the left of the engine and one arranged on the right of the engine) and are located between the rear attachment bracket 22 and the front frame 54. No accessories are mounted to these links.

The accessory mounting frame 26 comprises at least one hollow tube and the front struts 30, the rear struts 32 and the additional frame section 38 comprise hollow tubes. The hollow tubes of the accessory mounting frame 26 are joined together so that the hollow tubes of the accessory mounting frame define at least one fluid tight, leak free, chamber when in the manufactured condition. The hollow tubes of the accessory mounting frame 26 are joined together by a suitable manufacturing process, e.g. welding, brazing etc. Pressurised fluid, e.g. air, is supplied into the chamber within the accessory mounting frame 26 or fluid, air, is evacuated from the chamber within the accessory mounting frame 26 when the accessory mounting frame is manufactured or during maintenance of the gas turbine engine. The pressurised fluid, air, may be supplied from a gas bottle or the pressurised fluid, air, may be supplied from another suitable source of pressurised air, e.g. a compressor. The pressurised fluid may be supplied into the chamber within the accessory mounting frame through a respective non-return valve 74. The fluid may be evacuated from the chamber in the accessory mounting frame 26 by a vacuum pump.

Once the chamber in the accessory mounting frame 26 is pressurised with fluid, or the fluid has been evacuated from the chamber, the accessory mounting frame 26 is sealed and a pressure sensor 76 is provided to monitor the pressure in the chamber in the accessory mounting frame 26. If the pressure sensor 76 indicates that the pressure in the chamber in the accessory mounting frame 26 is below a predetermined level that was provided in the accessory mounting frame 26 this provides an indication that the accessory mounting frame 26 is damaged or there is a fault, e.g. there is a crack, due to leakage of fluid out of the hollow tubes of the accessory mounting frame 26. Alternatively if the pressure sensor 76 indicates that the pressure in the chamber in the accessory mounting frame 26 is above a predetermined level that was provided in the accessory mounting frame 26 this is an indication that the accessory mounting frame 26 is damaged or there is a fault, e.g. there is a crack, due to leakage of air into the hollow tubes of the accessory mounting frame 26.

The pressure sensor 76 may be a digital pressure sensor or an analogue pressure sensor. The use of the pressure sensor enables an early warning that there is a fault with the accessory mounting frame 26 during routine maintenance inspections of the gas turbine engine. It is important to detect impending failure of the accessory mounting frame 26 because the accessory mounting frame 26 carries all the accessories 35, 50 for the gas turbine engine and a failure of the accessory mounting frame 26 may lead to loss of operation of one or more of the accessories 35, 50, e.g. could lead to a loss of hydraulic supply, a loss of fuel supply, a loss of lubricant supply or a loss of electrical power which may result in a failure of the gas turbine engine. Thus, an advantage of the present invention is that the use of the pressure sensor 76 enables an early warning that there is fault, a crack, at the joint, weld or braze, between the hollow tubes of the mounting frame 26 or indeed actually in the hollow tubes of the mounting frame 26.

Figure 2:
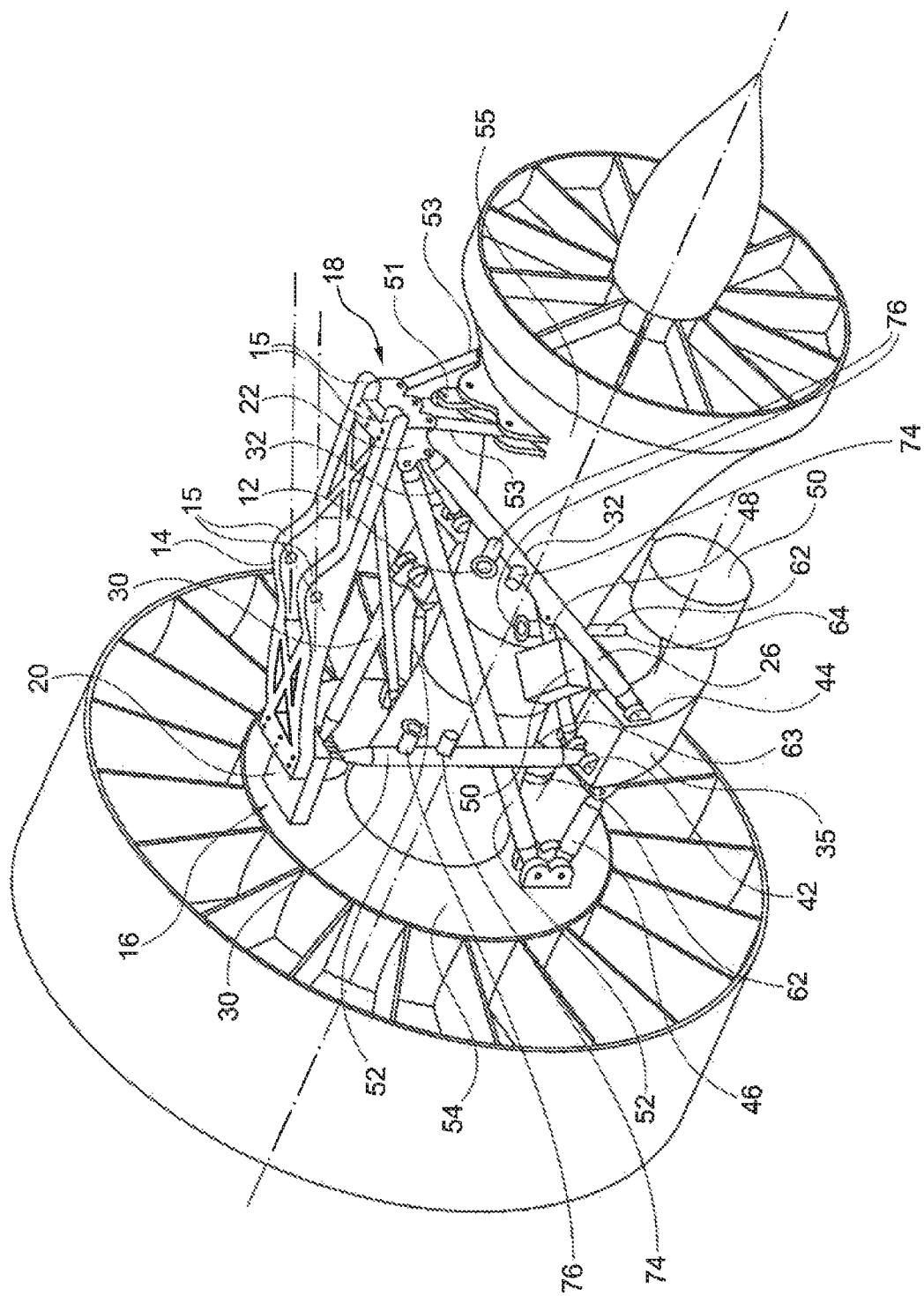
FIG. 2 is a perspective view of an alternative turbofan gas turbine engine having an accessory mounting frame according to the present invention.

An alternative embodiment is shown in FIG. 2. Where possible the same numerals have been used to identify similar parts with the embodiment of FIG. 1. It will be appreciated that although these embodiments are separate it may be possible to combine features of one embodiment with features of the other embodiments.

FIG. 2 depicts a turbofan gas turbine engine with the inner nacelle removed. The turbofan gas turbine engine is mounted to the airframe via a pylon 14 that is mounted to the main aircraft structure through lugs 15 at the midpoint and aft end of the pylon 14.

The pylon 14 has a front mounting bracket 20 which is attached to the front frame structure 54 at a front mount 16 and a rear mounting bracket 22 attached to a rear mount 18 on the turbine casing or engine rear structure 55 via links 53 at the rear of the turbofan gas turbine engine. The pylon 14 is positioned at the top of the turbofan gas turbine engine and struts 30, 32 extend down from the pylon 14 to form a frame 26 for mounting accessories. Two front struts 30 are provided, one for each side of the core engine. These front struts 30 are substantially vertical and diverge from the pylon 14 and are mounted to respective lugs 42 on the accessory gearbox 35, one lug on each side of the core engine. Two rear struts 32 are provided, one for each side of the core engine. These rear struts 32 are angled forwards and diverge from the pylon 14 and are mounted to respective rear lugs 44 on the accessory gearbox 35, one lug on each side of the core engine.

In this arrangement of struts 30 and 32 the accessory gearbox 35 is securely mounted to the pylon 14 but an optional axial link 46 may be provided between the front frame structure 54 and the accessory gearbox 35 to reduce unwanted axial movement of the accessory gearbox 35. Further accessories and dressings 50 may be mounted off the accessory gearbox 35 or the accessory mounting frame 26 directly.

A further support strut 48 may be provided between the front strut 30 and the rear strut 32 onto which additional accessories 50 may be mounted.

In the embodiment of FIG. 2 an engine thrust link 52 is located between the rear attachment bracket 22 and the front frame structure 54. No accessories are mounted to this thrust link 52. The engine thrust link 52 and optional axial link 46 at one side of the engine are secured to the front frame structure 54 by brackets at substantially the same point on the front frame structure 54.

Anti-vibration mounts 49 may be used between the front struts 30 and the front attachment bracket 20 and between the rear struts 32 and the rear attachment bracket 22. The vibration mounts 49 permit the engine loads or eigenfrequency behaviours of the turbofan gas turbine engine and engine casing structure to be decoupled from the accessory units 35, 50. Beneficially, the effects of whole engine vibration need not be considered to a high extent for the environment of the accessories.

Applied vibration effects of the accessory mounting frame 26 may be adjusted by the shape of the accessory mounting frame 26 and the attachment points to the pylon 14. The anti-vibration mounts 49, where used, have a different damping characteristic to the rest of the accessory mounting frame 26 and may be made from softer materials such as high temperature elastomeric or composite metal assemblies with implemented spring effects.

The attachment points at the rear of the frame can include swing links which mitigate the effects of thermal expansion of the engine casing or other components.

The accessory gearbox 35 is driven by the low speed drive train 63 and/or is driven by a high speed drive train 64.

Both drive trains should be covered by covers 62 for protection purpose and to avoid oil and heat contamination between the drive trains and adjacent hardware (e.g. accessories 50).

Figure 3:
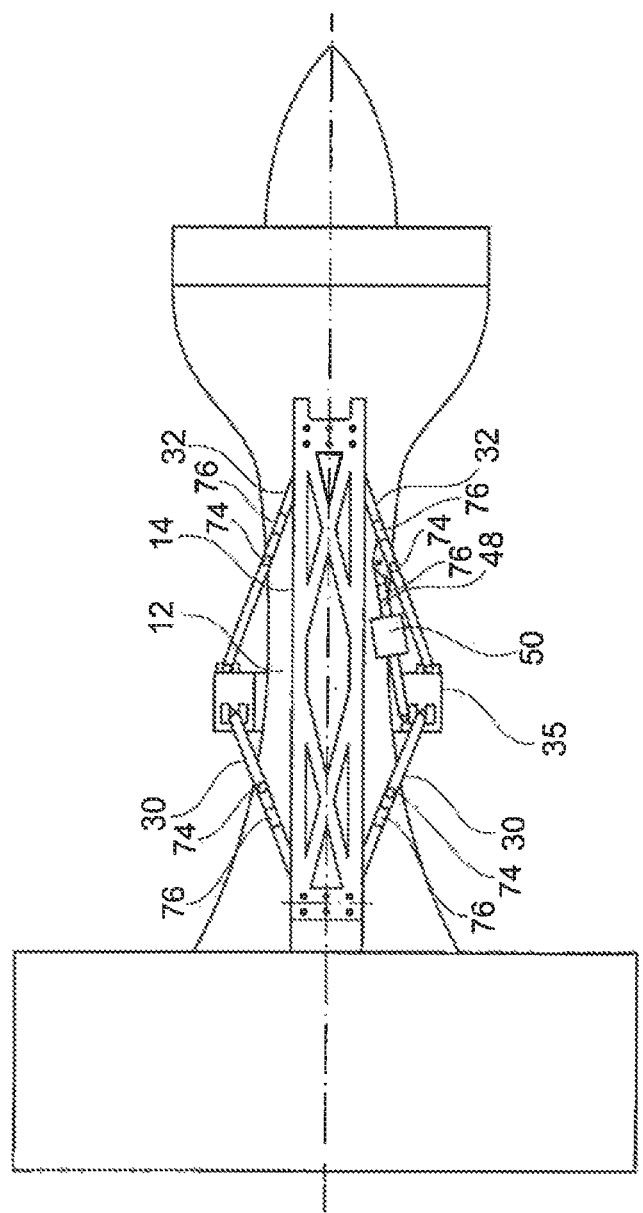
FIG. 3 is a top view of turbofan gas turbine engine shown in FIG. 2.

FIG. 3 is a simplified top view of the embodiment of FIG. 2. Some details shown in FIG. 2, such as the thrust struts 52, are omitted for clarity.

The accessory gearbox 35 is joined to the pylon 14, in between the core engine casings 12, by symmetrically arranged front struts 30 and symmetrically arranged rear struts 32. The front and rear struts 30 and 32 respectively diverge from the pylon 14 with the spacing at the distal ends being determined by the size of the accessory 35. It will be appreciated that this spacing may be provided by a spacing strut to which the accessory may be mounted. In this arrangement the front and rear struts 30 and 32 may not be directly attached to the accessory 35. Main accessory support structures 48 are attached to these struts 30 and 32 to further stiffen up the whole structure and provide preferred attachment place for further accessories 50.

The accessory mounting frame 26 shown in FIGS. 2 and 3 also comprises at least one hollow tube and the front struts 30, the rear struts 32 and the further support struts 48 comprise hollow tubes. The hollow tubes of the accessory mounting frame 26 are joined together so that the hollow tubes of the accessory mounting frame define at least one fluid tight, leak free, chamber when in the manufactured condition. The hollow tubes of the accessory mounting frame 26 are joined together by a suitable manufacturing process, e.g. welding, brazing etc. Pressurised fluid, e.g. air, is supplied into the chamber within the accessory mounting frame 26 or fluid, air, is evacuated from the chamber within the accessory mounting frame 26. The pressurised fluid, air, may be supplied from a gas bottle or the pressurised fluid, air, may be supplied from another suitable source of pressurised air, e.g. a compressor. The pressurised fluid may be supplied into the chamber within the accessory mounting frame through a respective non-return valve 74. The fluid may be evacuated from the chamber in the accessory mounting frame 26 by a vacuum pump.

Once the chamber in the accessory mounting frame 26 is pressurised with fluid, or the fluid has been evacuated from the chamber, the accessory mounting frame 26 is sealed and a pressure sensor 76 is provided to monitor the pressure in the chamber in the accessory mounting frame 26. If the pressure sensor 76 indicates that the pressure in the chamber in the accessory mounting frame 26 is below a predetermined level that was provided in the accessory mounting frame 26 this provides an indication that the accessory mounting frame 26 is damaged or there is a fault, e.g. there is a crack, due to leakage of fluid out of the hollow tubes of the accessory mounting frame 26. Alternatively if the pressure sensor 76 indicates that the pressure in the chamber in the accessory mounting frame 26 is above a predetermined level that was provided in the accessory mounting frame 26 this is an indication that the accessory mounting frame 26 is damaged or there is a fault, e.g. there is a crack, due to leakage of air into the hollow tubes of the accessory mounting frame 26.

The pressure sensor 76 may be a digital pressure sensor or an analogue pressure sensor. The use of the pressure sensor enables an early warning that there is a fault with the accessory mounting frame 26 during routine maintenance inspections of the gas turbine engine. It is important to detect impending failure of the accessory mounting frame 26 because the accessory mounting frame 26 carries all the accessories 35, 50 for the gas turbine engine and a failure of the accessory mounting frame 26 may lead to loss of operation of one or more of the accessories 35, 50, e.g. could lead to a loss of hydraulic supply, a loss of fuel supply, a loss of lubricant supply or a loss of electrical power which may result in a failure of the gas turbine engine. Thus, an advantage of the present invention is that the use of the pressure sensor 76 enables an early warning that there is fault, a crack, at the joint, weld or braze, between the hollow tubes of the mounting frame 26 or indeed actually in the hollow tubes of the mounting frame 26.

In the accessory mounting frame 26 of FIGS. 2 and 3 each of the front struts 30 comprises a hollow tube, each of the rear struts 32 comprises a hollow tube and each of the further support struts 48 comprises a hollow tube. Each of the tubes defines a respective chamber in the accessory mounting frame and each chamber is evacuated, or pressurised, and the pressure in each chamber of the accessory mounting frame 26 is monitored using a respective pressure sensor 76. If a pressure sensor 76 indicates that the pressure in the associated chamber within the accessory mounting frame 26 is below, or above, the predetermined level that was provided in that chamber within the accessory mounting frame 26 this provides an indication that the portion of the accessory mounting frame 26 defining that chamber is damaged or there is a fault, e.g. there is a crack, due to leakage of fluid out of, or into, that particular chamber within hollow tubes of the accessory mounting frame 26.

Figure 4:
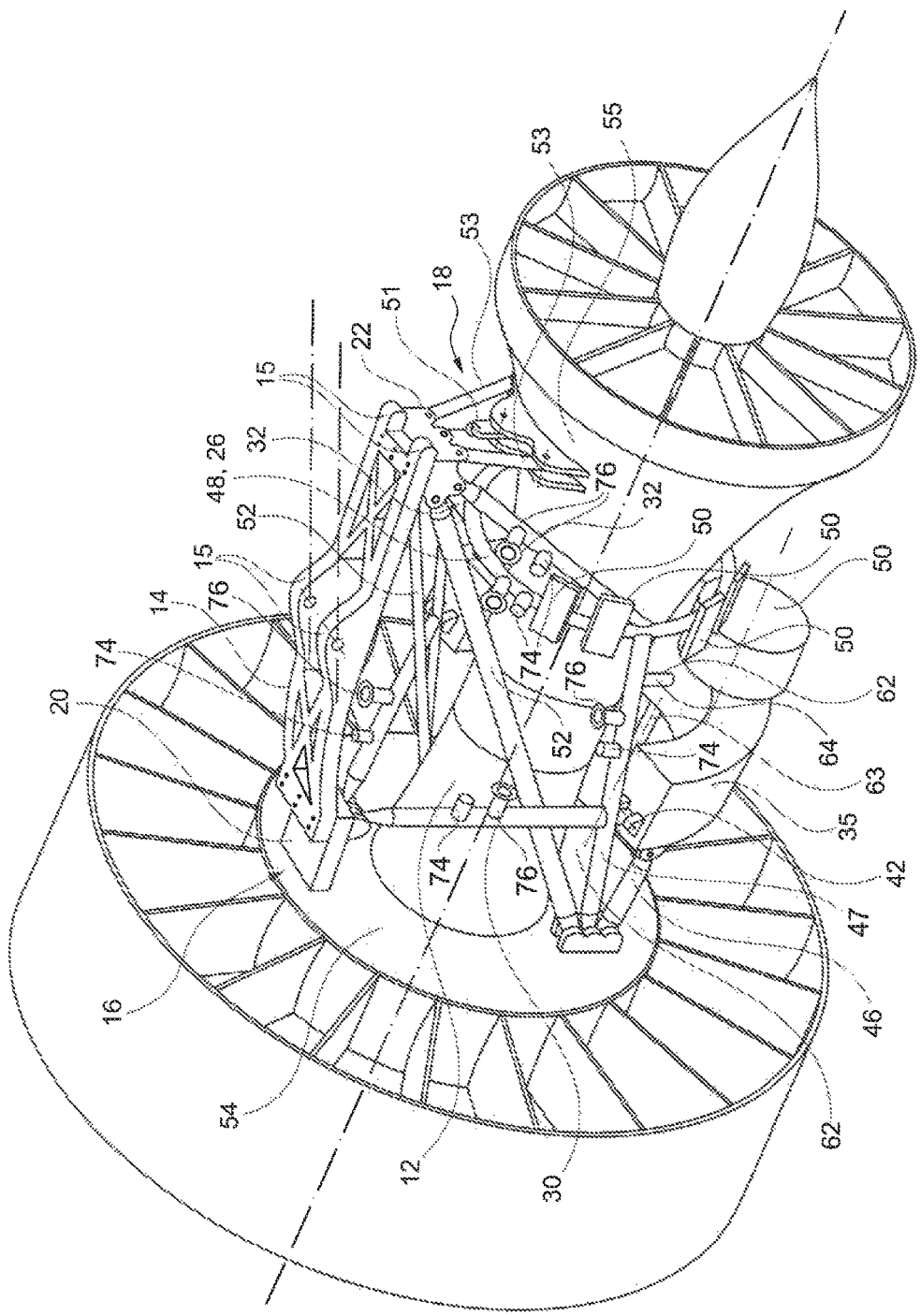
FIG. 4 is a perspective view of a further turbofan gas turbine engine having an accessory mounting frame according to the present invention.

FIG. 4 depicts an alternative embodiment, where the same reference numerals are used for the same components of the previous embodiments. The accessory mounting frame 26 of the turbofan gas turbine engine assembly is provided with a hooped accessory support structure 48 which is coaxially arranged with the engine axis. The hooped accessory support structure 48 may be provided as separate elements which are hinged, bolted, welded or otherwise secured together so that it can be assembled around the engine.

The hooped accessory support structure 48 has the primary function of carrying a number of accessories 50 other than the main accessory gearbox 35. Beneficially by mounting accessories 50 in this way it is possible to isolate the accessories 50 attached to the hooped accessory support structure 48 from vibrations and loads from both the accessory gearbox 35 and the engine.

The accessory mounting frame 26 again comprises front struts 30 and rear struts 30. Each front strut 30 extends from the front mount 16 to the accessory gearbox 35 and each rear strut 32 extends from the rear mount 18 to the hooped accessory support structure 48 on the respective sides of the turbofan gas turbine engine. Additional struts 47 extend from the front frame structure 54 to the hooped accessory support structure 48 on respective sides of the turbofan gas turbine engine. Each additional strut 47 intersects a respective one of the front struts 30.

Engine thrust links 52 are located between the rear attachment bracket 22 and the front frame structure 54. Optional axial links 46 are provided between the front frame structure 54 and the accessory gearbox 35 to reduce unwanted axial movement of the accessory gearbox 35. The engine thrust link 52, the optional axial link 46 and the additional strut 47 at one side of the engines are secured to the front frame structure 54 by brackets at substantially the same point on the front frame structure 54.

The accessory mounting frame 26 shown in FIG. 4 also comprises at least one hollow tube and the front struts 30, the rear struts 32, the additional struts 47 and the hooped accessory support structure 48 comprise hollow tubes. The hollow tubes of the accessory mounting frame 26 are joined together so that the hollow tubes of the accessory mounting frame define at least one fluid tight, leak free, chamber when in the manufactured condition, e.g. each front strut 30 is joined to the associated rear strut 32 via associated additional strut 47 and hooped accessory support structure 48. The hollow tubes of the accessory mounting frame 26 are joined together by a suitable manufacturing process, e.g.

welding, brazing etc. Pressurised fluid, e.g. air, is supplied into the chamber within the accessory mounting frame 26 or fluid, air, is evacuated from the chamber within the accessory mounting frame 26. The pressurised fluid, air, may be supplied from a gas bottle or the pressurised fluid, air, may be supplied from another suitable source of pressurised air, e.g. a compressor. The pressurised fluid may be supplied into the chamber within the accessory mounting frame through a respective non-return valve 74. The fluid may be evacuated from the chamber in the accessory mounting frame 26 by a vacuum pump.

Once the chamber in the accessory mounting frame 26 is pressurised with fluid, or the fluid has been evacuated from the chamber, the accessory mounting frame 26 is sealed and a pressure sensor 76 is provided to monitor the pressure in the chamber in the accessory mounting frame 26. If the pressure sensor 76 indicates that the pressure in the chamber in the accessory mounting frame 26 is below a predetermined level that was provided in the accessory mounting frame 26 this provides an indication that the accessory mounting frame 26 is damaged or there is a fault, e.g. there is a crack, due to leakage of fluid out of the hollow tubes of the accessory mounting frame 26. Alternatively if the pressure sensor 76 indicates that the pressure in the chamber in the accessory mounting frame 26 is above a predetermined level that was provided in the accessory mounting frame 26 this is an indication that the accessory mounting frame 26 is damaged or there is a fault, e.g. there is a crack, due to leakage of air into the hollow tubes of the accessory mounting frame 26.

The pressure sensor 76 may be a digital pressure sensor or an analogue pressure sensor. The use of the pressure sensor enables an early warning that there is a fault with the accessory mounting frame 26 during routine maintenance inspections of the gas turbine engine. It is important to detect impending failure of the accessory mounting frame 26 because the accessory mounting frame 26 carries all the accessories 35, 50 for the gas turbine engine and a failure of the accessory mounting frame 26 may lead to loss of operation of one or more of the accessories 35, 50, e.g. could lead to a loss of hydraulic supply, a loss of fuel supply, a loss of lubricant supply or a loss of electrical power which may result in a failure of the gas turbine engine. Thus, an advantage of the present invention is that the use of the pressure sensor 76 enables an early warning that there is a fault, a crack, at the joint, weld or braze, between the hollow tubes of the mounting frame 26 or indeed actually in the hollow tubes of the mounting frame 26.

In the accessory mounting frame of FIG. 4 the hollow tubes of the accessory mounting frame 26 are joined together to form a number of chambers in the accessory mounting frame 26 and each chamber is evacuated, or pressurised, and the pressure in each chamber of the accessory mounting frame 26 is monitored using a respective pressure sensor 76. If a pressure sensor 76 indicates that the pressure in the associated chamber within the accessory mounting frame 26 is below, or above, the predetermined level that was provided in that chamber within the accessory mounting frame 26 this provides an indication that the portion of the accessory mounting frame 26 defining that chamber is damaged or there is a fault, e.g. there is a crack, due to leakage of fluid out of, or into, that particular chamber within hollow tubes of the accessory mounting frame 26. In FIG. 4 each hollow tube, each of the front struts 30, each of the rear struts 32, each of the additional struts 47 and the hooped accessory support structure 48 define its own respective chamber and has a respective pressure sensor 76.

Alternatively, the hollow tubes of the front struts 30, the rear struts 32, the additional struts 47 and the hooped accessory support structure 48 may be arranged to define a single chamber with a single pressure sensor.

One of the many advantages of using an accessory mounting frame is that it can be removed from the engine assembly without having to remove the engine from the pylon structure. Accessories may be pre-mounted on the accessory mounting frame prior to the accessory mounting frame being mounted to the front and/or rear mounts. This is advantageous as it can speed up repair and replacement of accessories. The provision of the pressure sensors to detect changes in the pressure within the chamber, or chambers, defined by the hollow tube, or hollow tubes, of the accessory mounting frame enables early detection of damage to the accessory mounting frame and enabling the accessory mounting frame to be repaired or replaced.

The turbofan gas turbine engine is mounted to the pylon 14 by engine rear mount attachment struts 53. A fail safe swing link 51 further connects the turbofan gas turbine engine 10 via the rear attachment bracket 22 to the pylon 14 to prevent the turbofan gas turbine engine becoming detached from the pylon 14 should the engine rear mount attachment struts fail for any reason.

Optionally the frame maybe used to stiffen the engine main structure. However the vibration isolation effect described before may be affected, the rotor tip clearance will be improved and the material thickness of the core engine casings can be reduced in thickness.

Although the present invention has been described with reference to the use of air to pressurise the hollow tubes of the accessory mounting frame any suitable fluid may be used. However, it may be particularly advantageous to use an inert gas so that the inert gas inhibits, or prevents, corrosion of the hollow tubes. An inert gas is a gas which will not react with the hollow tubes, for example nitrogen, helium, argon, neon etc. These gases may also be supplied into the hollow tubes of the accessory mounting frame from suitable gas bottles.

Although the present invention has been described with reference to a turbofan gas turbine engine it may be possible to provide a frame according to the present invention on a turbo-shaft gas turbine engine, a turbo-propeller gas turbine engine or a turbojet gas turbine engine. Although the present invention has been described with reference to a three shaft engine gas turbine engine it is equally applicable to a two shaft gas turbine engine and to a single shaft gas turbine engine.

DRAWING REFERENCES

Ref No. Description

1 Air Intake
2 Propulsive fan
3 Intermediate pressure compressor
4 High pressure compressor
5 Combustion Equipment
6 High Pressure turbine
7 Intermediate pressure turbine
8 Low pressure turbine
9 Exhaust nozzle
10 Gas turbine engine
12 Core engine casing
14 Pylon structure
15 Pylon lugs
16 Front mount 18 Fail safe rear mount
20 Front attachment bracket
22 Rear attachment bracket
24 Engine link
26 Accessory mounting frame
28 Accessory mounting frame mounts
30 Front strut
32 Rear strut
34 Swing link
35 Accessory or Accessory Gearbox
36 Hinge mount
38 Additional frame section
40 Inner nacelle
41 Opening in Inner Nacelle
42 Forward on accessory gearbox
44 Rearward lug on accessory gearbox
46 Optional axial link
47 Additional Struts
48 Main accessory support structure
49 Anti vibration mount
50 Accessory or Unit
51 Fail save swing link
52 Thrust strut
53 Engine rear mount attachment strut
54 Engine front frame structure
55 Engine rear structure
58 Fan cooling flow
59 Fan bypass stream
60 Core exhaust stream
61 Fuel Injector
62 Cover for drive train
63 Low speed axial drive train
64 High speed radial drive train
65 Accessory gearbox drive shaft coupling
66 Low pressure shaft
67 Intermediate pressure shaft
68 High pressure shaft
74 Non-return valve
76 Pressure gauge

The invention claimed is:

1. A gas turbine engine assembly connected to a pylon structure for mounting a gas turbine engine to an aircraft,
the gas turbine engine assembly having a frame supporting at least one accessory independently of the gas turbine engine,
the frame being attached to the pylon structure at a forward engine mounting location, the frame having a pair of front struts, each strut of the pair of front struts having a first end adjacent the forward engine mounting location and a second end remote from the forward engine mounting location, the front struts passing the gas turbine engine on opposing sides, each front strut extending downward below the pylon structure,
the at least one accessory being mounted below the pylon structure and at the second end of the pair of front struts, the pair of front struts providing a direct load path between the at least one accessory and the forward engine mounting location,
the frame comprising at least one hollow tube, the at least one hollow tube being fluid tight, the at least one hollow tube being evacuated or containing pressurised fluid, and
a pressure sensor being arranged to detect a change in the pressure in the at least one hollow tube to indicate that there is a leak in the at least one hollow tube when the frame is damaged.

2. The gas turbine engine assembly as claimed in claim 1 wherein the frame is attached to the pylon structure at a rearward engine mounting location, the frame having a pair of rear struts, each strut of the pair of rear struts having a first end adjacent the rearward engine mounting location and a second end remote from the rearward engine mounting location, each strut of the pair of rear struts passing the gas turbine engine on opposing sides,
the at least one accessory being mounted at the second end of the pair of rear struts, the pair of rear struts providing a direct load path between the at least one accessory and the rearward engine mounting location.

* * * * *